(12) United States Patent
Taki et al.

(10) Patent No.: US 6,433,953 B1
(45) Date of Patent: Aug. 13, 2002

(54) RECORDING/REPRODUCING APPARATUS

(75) Inventors: Yoshitsugu Taki; Takao Hiramoto; Yoshihisa Takayama, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,379

(22) Filed: Dec. 9, 1999

(30) Foreign Application Priority Data

| Dec. 11, 1998 | (JP) | 10-353479 |
| Dec. 11, 1998 | (JP) | 10-353480 |
| Dec. 11, 1998 | (JP) | 10-353481 |

(51) Int. Cl.⁷ ............ G11B 5/027; G03B 1/58
(52) U.S. Cl. ................ 360/85; 242/332.4
(58) Field of Search ........ 360/85, 95, 130.21; 242/332.4, 332, 332.1

(56) References Cited

U.S. PATENT DOCUMENTS

| 3,764,088 A | 10/1973 | Yamada et al. | 242/195 |
| 3,783,200 A | 1/1974 | Jantzen et al. | 179/100.2 |
| 3,797,776 A | 3/1974 | Umeda et al. | 242/188 |
| 3,807,652 A | * 4/1974 | Kruhn et al. | 242/332 |
| 3,836,096 A | 9/1974 | Fukushima et al. | 242/197 |
| 4,432,508 A | 2/1984 | Inoue et al. | 242/195 |
| 4,477,851 A | 10/1984 | Dalziel et al. | 360/95 |
| 4,608,614 A | 8/1986 | Rinkleib et al. | 360/95 |
| 5,128,815 A | 7/1992 | Leonardt et al. | 360/85 |
| 5,333,810 A | 8/1994 | Hoge et al. | 242/332.4 |
| 5,478,021 A | 12/1995 | Davis et al. | 242/332.1 |
| 5,739,976 A | 4/1998 | Sakai et al. | 360/85 |

FOREIGN PATENT DOCUMENTS

| BE | 653065 | 12/1964 |
| EP | 0 042 989 A2 * | 1/1982 |
| WO | WO 92/10831 | 6/1992 |
| WO | WO 92/21127 | 11/1992 |

* cited by examiner

*Primary Examiner*—William Klimowicz
(74) *Attorney, Agent, or Firm*—Ronald P. Kananen; Rader, Fishman & Grauer, PLLC

(57) ABSTRACT

A recording/reproducing apparatus is provided in which an increase in recording density is achieved and in which the tape loading mechanism is simplified. A recording/reproducing apparatus of the type which uses a tape cassette which has a tape reel in a cartridge and in which a tape including a tape-shaped recording medium is wound around the tape reel, includes a take-up reel adapted to take up the tape-shaped recording medium and having a height equal to that of the tape reel of the tape cassette attached to the recording/reproducing apparatus, and a rotary head for recording and/or reproducing information on and/or from the tape-shaped recording medium by a helical scan system.

10 Claims, 14 Drawing Sheets

RECORDING/REPRODUCING APPARATUS

BACKGROUND OF THE INVENTION

1. Field of the Invention

The present invention relates to a novel recording/reproducing apparatus. More specifically, the present invention relates to a recording/reproducing apparatus of the type which uses a tape cassette which has one tape reel in a cartridge and in which a tape including a tape-shaped recording medium is wound around the tape reel, wherein an increase in recording density is achieved and wherein the tape loading mechanism is simplified.

2. Description of the Related Art

There exists a recording/reproducing apparatus of the type which performs recording/playback on a one-reel tape cassette which has one tape reel in a cartridge and in which a tape including a tape-shaped recording medium is wound around the tape reel.

In the conventional recording/reproducing apparatus using a one-reel tape cassette, recording and/or reproduction on and/or from the tape is conducted by a stationary head.

Further, a take-up reel is provided in the recording/reproducing apparatus, and when a one-reel tape cassette is attached to the recording/reproducing apparatus, an elastic lead-out tape is fed out from the take-up reel to the one-reel tape cassette, and the forward end of the lead-out tape is engaged with a leader tape connected with the forward end of the tape and then the lead-out tape is taken up on the take-up reel, whereby the tape is drawn out of the cartridge.

In the recording and/or reproduction by means of a stationary head, it is impossible to increase recording density.

To increase recording density, recording and/or reproduction is to be performed by helical scanning using a rotary head. However, in the conventional system in which the lead-out tape goes to meet the leader tape to perform tape loading, the mechanism for forming the tape path for helical scanning is complicated.

Further, in the above-described conventional recording/reproducing apparatus using a one-reel tape cassette, a mechanism for feeding out the lead-out tape from the take-up reel side for leading out and engaging the forward end of the lead-out tape with the leader tape is complicated. Further, there is every possibility of the engagement of the forward end of the lead-out tape with the leader tape failing. In proportion to the complexity of the mechanism, the number of parts operating at the time of loading/unloading the one-reel tape cassette to/from the recording/reproducing apparatus is large, resulting in a rather poor durability.

SUMMARY OF THE INVENTION

The present invention has been made in view of the above problems. It is an object of the present invention to achieve an increase in recording density and simplify the tape loading mechanism.

To achieve the above object, there is provided, in accordance with the present invention, a recording/reproducing apparatus in which there is provided a take-up reel having the same height as the tape reel of the tape cassette attached to the recording/reproducing apparatus and a rotary head for recording and/or reproducing information on and/or from the tape-shaped recording medium by a helical scanning system.

Thus, in the recording/reproducing apparatus of the present invention, recording and/or reproduction is performed by helical scanning, so that it is possible to increase recording density, and by making the height of the take-up reel equal to the height of the tape reel of the tape cassette attached to the recording/reproducing apparatus, it is possible to simplify the tape loading mechanism.

Further, to achieve the above object, in the recording/reproducing apparatus of the present invention, there is provided on opposite surfaces of upper and lower flange portions of the take-up reel engagement means adapted to engage with an engagement portion formed at the forward end of the leader tape.

Thus, in the recording/reproducing apparatus of the present invention, the engagement means engages with the engagement portion at the forward end of the leader tape by the rotation of the take-up reel in the taking up direction, and the leader tape can be drawn out, so that the mechanism for drawing out the leader tape is simplified, and the leader tape can be reliably drawn out.

Further, to achieve the above object, in the tape cassette of the present invention, engagement edges extending in the tape width direction are formed on the upper and lower edges of the forward end portion of the leader tape.

Thus, in the tape cassette of the present invention, the engagement edges engage with the engagement means provided in the take-up reel, whereby the leader tape can be easily drawn out of the cartridge.

Further, to achieve the above object, in the recording/reproducing apparatus of the present invention, a leader tape guide which guides the leader tape through a substantially linear path is provided between the take-up reel for taking up the tape and the tape outlet of the tape cassette attached to the cassette attachment portion, and a head is provided on one side of the leader tape guide and a lead-out guide in a standby condition is provided on the other side thereof, and when the tape-shaped recording medium has reached a position corresponding to the leader tape guide, the leader tape guide is rotated to retract it from between the head and the lead-out guide, the lead-out guide being moved to the loading position to form a tape path to cause the tape-shaped recording medium to be opposed to the head.

Thus, in the recording/reproducing apparatus of the present invention, recording and/or reproduction is conducted while running the tape-shaped recording medium wound around the head drum provided with a rotary head, thereby achieving an increase in recording density in recording by helical scanning. Further, the tape path for the tape-shaped recording medium is formed after taking up the leader tape onto the take-up reel, whereby the leader tape does not come into contact with the tape running system members such as the head drum, the capstan, the lead-out guide and the pinch roller, so that the leader tape does not adversely affect these tape running system members.

DESCRIPTION OF THE PREFERRED EMBODIMENT

An embodiment of the recording/reproducing apparatus of the present invention will now be described with reference to the accompanying drawings. In the embodiment shown, the present invention is applied to a recording/reproducing apparatus for data storage.

First, a one-reel tape cassette used in a recording/reproducing apparatus according to the present invention will be described.

Figure 1:
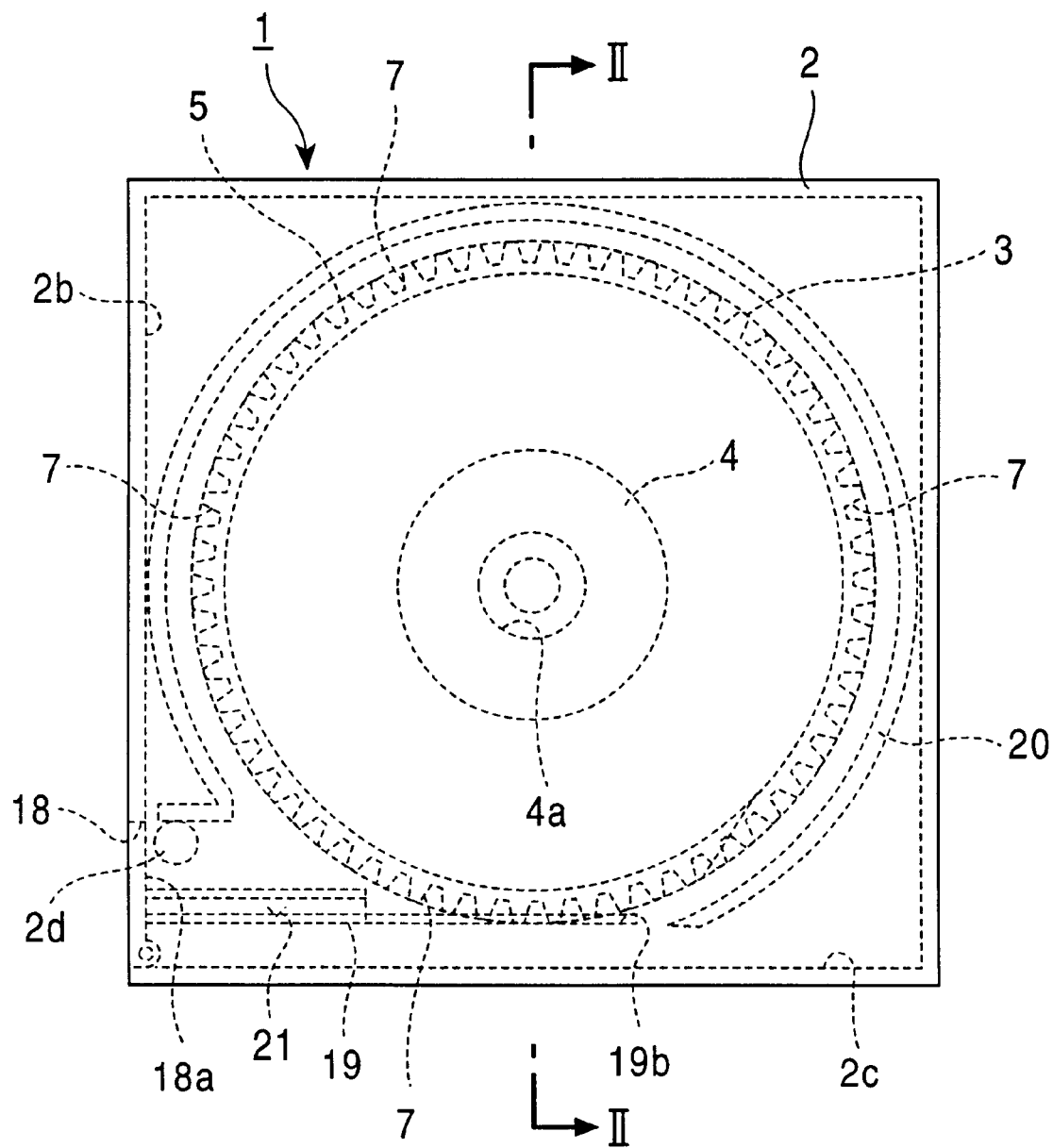
FIG. 1 is a plan view showing, with FIGS. 2 through 7, a one-reel tape cassette used in a recording/reproducing apparatus according to the present invention.

As shown in FIG. 1, a one-reel tape cassette 1 is equipped with a cartridge 2 having a rectangular configuration in plan view.

In the cartridge 2, a tape reel 3 is rotatably accommodated. The tape reel 3 consists of a cylindrical hub 4 and disc-like flange portions 5 and 6 integrally formed above and below the hub 4. In the entire outer periphery of the upper and lower flange portions 5 and 6, there are formed step portions, and feeding teeth 7 and 8 are respectively formed on the step portions of the upper flange portion 5 and the lower flange portion 6 so as to be arranged circumferentially. Of the portion between the upper and lower flange portions 5 and 6, the portion 9 on the inner side of the step portions serves as a tape winding portion around which a tape-shaped recording medium such as a magnetic tape, that is, a tape 10, is wound, and the step portions 11 serve as a leader tape winding portion around which a leader tape 12 is wound.

Figure 2:
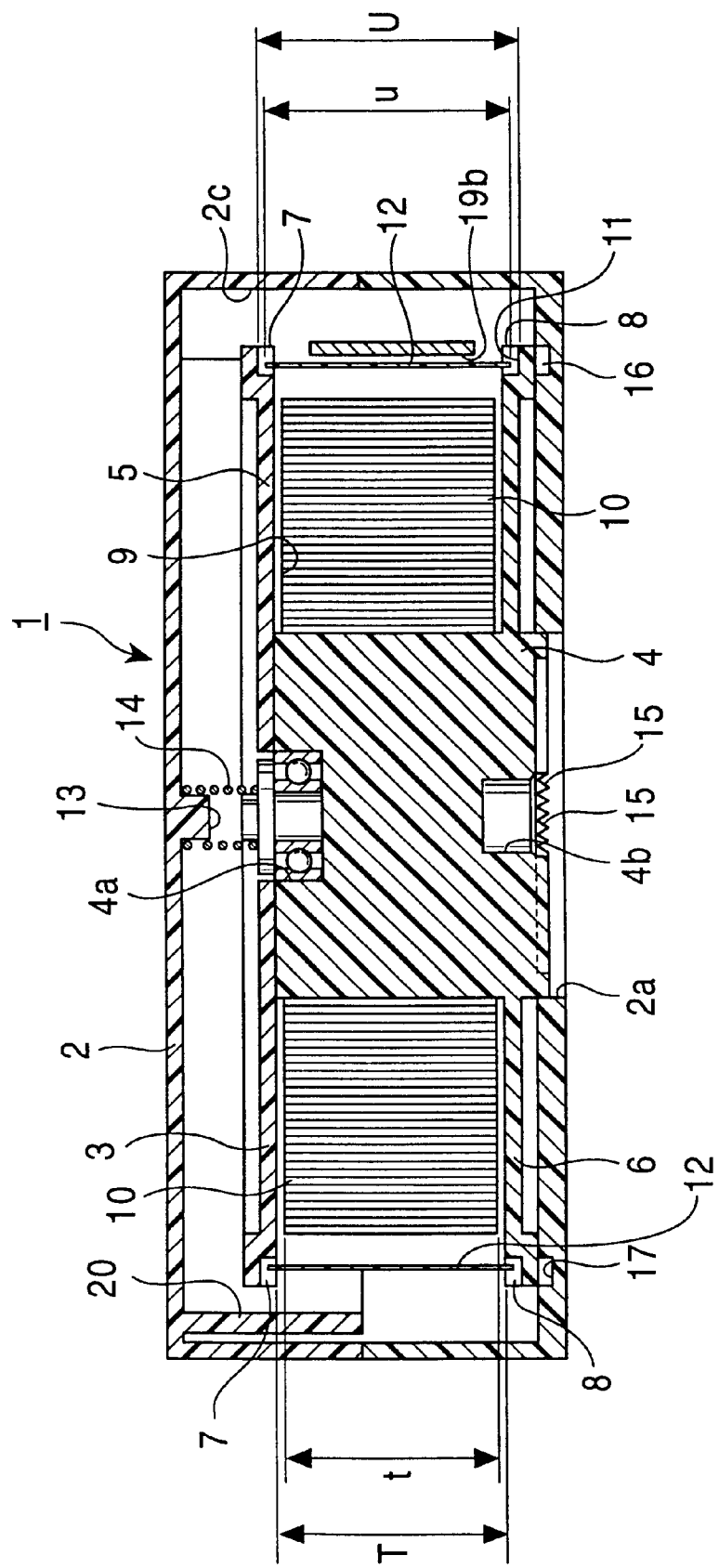
FIG. 2 is a longitudinal sectional view.
Figure 3:
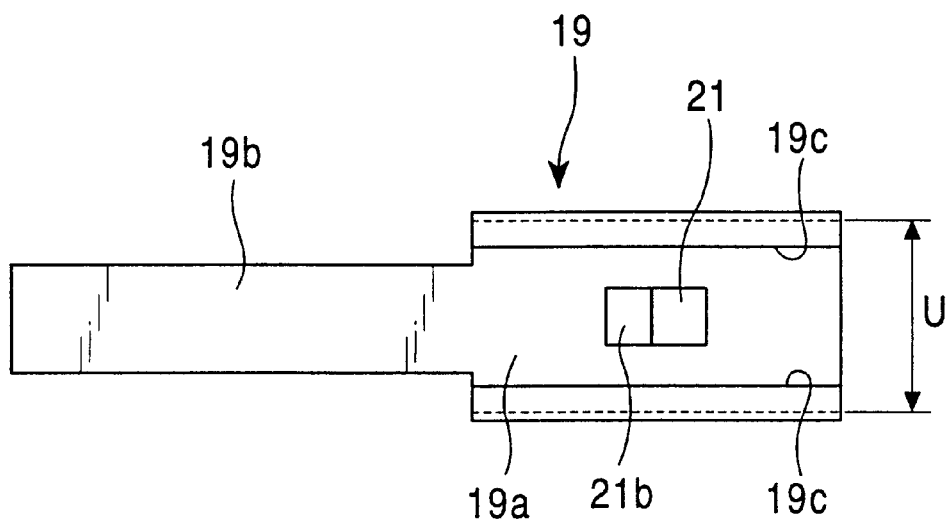
FIG. 3 is a front view showing, with FIGS. 4 through 6, a tape guide portion.
Figure 4:
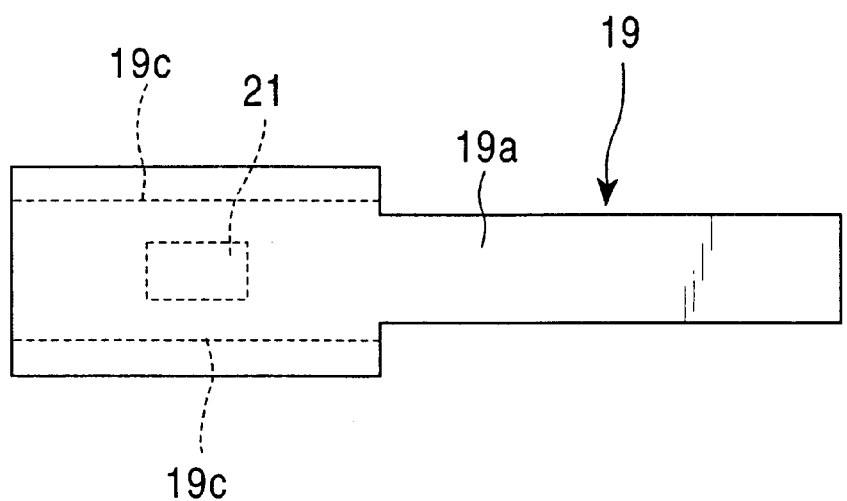
FIG. 4 is a backside view.
Figure 5:
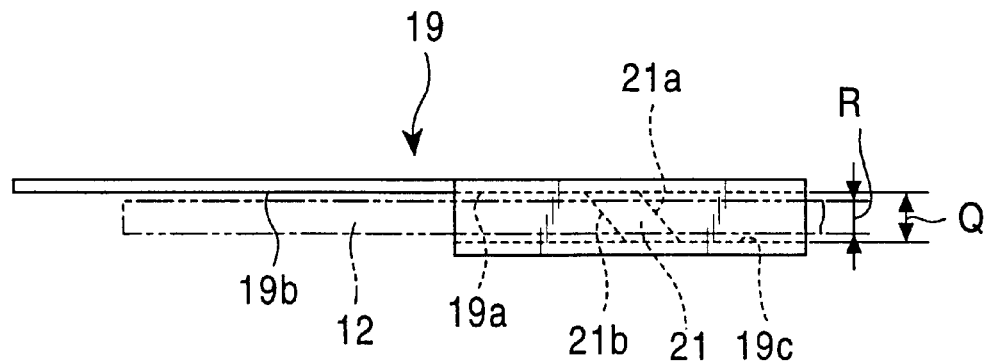
FIG. 5 is a plan view.
Figure 6:
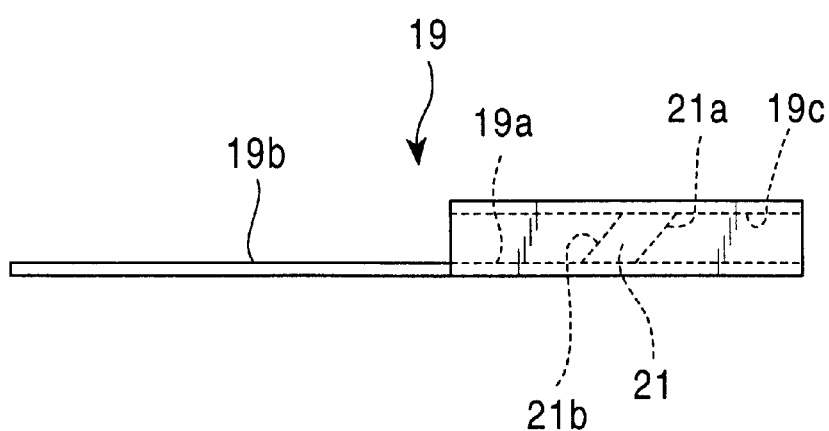
FIG. 6 is a bottom view.

As shown in FIG. 2, the vertical width T of the tape winding portion 9 is smaller than the vertical width U of the leader tape winding portion 11 and is slightly larger than the width t of the tape 10. Further, the vertical width U of the leader tape winding portion 11 is slightly larger than the width u of the portion excluding the leader tape 12 described below.

A recess 4a is formed in the upper end surface of the hub 4, and a protrusion 13 is formed on the lower surface of the top wall of the cartridge 2 at the position corresponding to the recess 4a. A compression coil spring 14 is compressed between the recess 4a and the top wall surface of the cartridge 2, and the upper end portion of the compression coil spring 14 is fitted onto the protrusion 13, whereby the tape reel 3 is downwardly biased.

A center hole 4b is formed at the center of the lower surface of the hub 4, and engagement ridges 15 extending radially from the center hole 4b are formed.

In the bottom wall of the cartridge 2, there is formed a reel base insertion hole 2a, through which a reel base described below is inserted into the cartridge 2.

Further, in the lower surface of the outer peripheral portion of the lower flange portion 6, there are formed lock teeth 16 so as to be arranged circumferentially, and lock recesses 17 are formed in the bottom wall of the cartridge 2 at positions opposed to the lock teeth 16. Their configuration is not restricted to that shown in the drawing. They may for example, be serrated or trapezoidal to facilitate the engagement.

At an end portion of a side wall 2b of the cartridge 2, there is formed a tape outlet 18, which is opened and closed by a rotatable lid 18a.

A tape guide portion 19 is formed in the cartridge 2 at a position in the vicinity of the tape outlet 18. The tape guide portion 19 is close to a side wall 2c close to the tape outlet 18 and formed so as to be substantially in parallel with the side wall 2c, and has a main surface portion 19a opposed to the side wall 2c. One end portion of the main surface portion 19a is close to the tape outlet 18, and the other end portion thereof extends to a position corresponding to a portion spaced apart from the central portion with respect to the longitudinal direction of the side wall 2c opposite to the tape outlet 18, and the portion 19b closer to the other end portion from the central portion (hereinafter referred to as the "tape press contact surface") is positioned in the leader tape winding portion 11 of the tape reel 3. Of the main surface portion 19a, recessed guide portions 19c whose openings are opposed to each other are formed on the opposed sides of the tape reel 3 of the portion extending from the tape outlet 18 side end to one end of the tape press contact surface 19b. And, the vertical width U of the main surface portion 19a is slightly larger than the vertical width of the leader tape 12, and the distance T between the opening end of the upper recessed guide portion 19c and the opening end of the lower recessed guide portion 19c is somewhat larger than the vertical width t of the tape 10.

Of the main surface portion 19a of the tape guide portion 19, a stopper 21 protrudes at a position at the center with respect to the length direction and height direction of the portion where the recessed guide portions 19c are formed (See FIGS. 3 through 6). The forward end portion of the stopper 21 is inclined so that it may be displaced to the tape outlet 18 side, and the surface 21a on the tape outlet 18 side serves as an engagement surface, and the surface 21b on the opposite side of the engagement surface 21a serves as a sliding surface.

In the cartridge 2, a leader tape guide wall 20 is formed so as to directly surround the outer side of the leader tape winding portion 11 of the tape reel 3. The guide wall 20 vertically extends from the top wall of the cartridge 2, and is formed so as to surround the outer side up to the intermediate portion with respect to the vertical width of the leader tape winding portion 11. This leader tape guide wall 20 is formed so as to extend substantially over the entire periphery, and one end thereof ends in the vicinity of one end portion of the tape guide portion 19, and the other end thereof ends at a position in the vicinity of the other end portion of the tape guide portion 19.

And, the tape 10 is first wound around the hub 4 of the tape reel 3 in the tape winding portion 9, and the leader tape 12 is joined to the forward end of the tape 10, the leader tape 12 being wound around the leader tape winding portion 11. In the condition in which the tapes 10 and 12 have been completely taken up in the cartridge 2, an engagement hole 12a formed in the forward end portion of the leader tape 12 engages with an engagement surface 21a of the stopper 21 of the tape guide portion 19, so that taking up in the cartridge 2 is restricted. The height Q of the stopper 21 is the same as or larger than the thickness R of the leader tape 12 (Q≧R), so that the stopper 21 is reliably engaged with the engagement hole 12a.

In particular, the leader tape 12 has high rigidity and elasticity, and when the portion other than the portion where the engagement hole 12a is formed passes the portion where the stopper 21 is formed, the central portion with respect to the vertical direction deflects so as to protrude toward the tape reel 3 and the rigidity increases, so that when the engagement hole 12a corresponds to the stopper 21, the deflection is canceled, and the engagement hole 12a is reliably engaged with the stopper 21.

Further, in the cartridge 2, a tape guide pin 2d is formed close to the tape outlet 18 side end of the tape guide portion 19.

The width t of the tape 10 is slightly smaller than the vertical width T of the tape winding portion 9 of the tape reel 3, and the width u of the leader tape 12 is larger than the vertical width T of the tape winding portion 9 of the tape reel 3, and slightly smaller than the vertical width U of the leader tape winding portion 11. The leader tape 12 is formed of polycarbonate resin, ABS resin, vinyl chloride or the like, and its rigidity and elasticity are higher than those of the tape 10.

Figure 7:
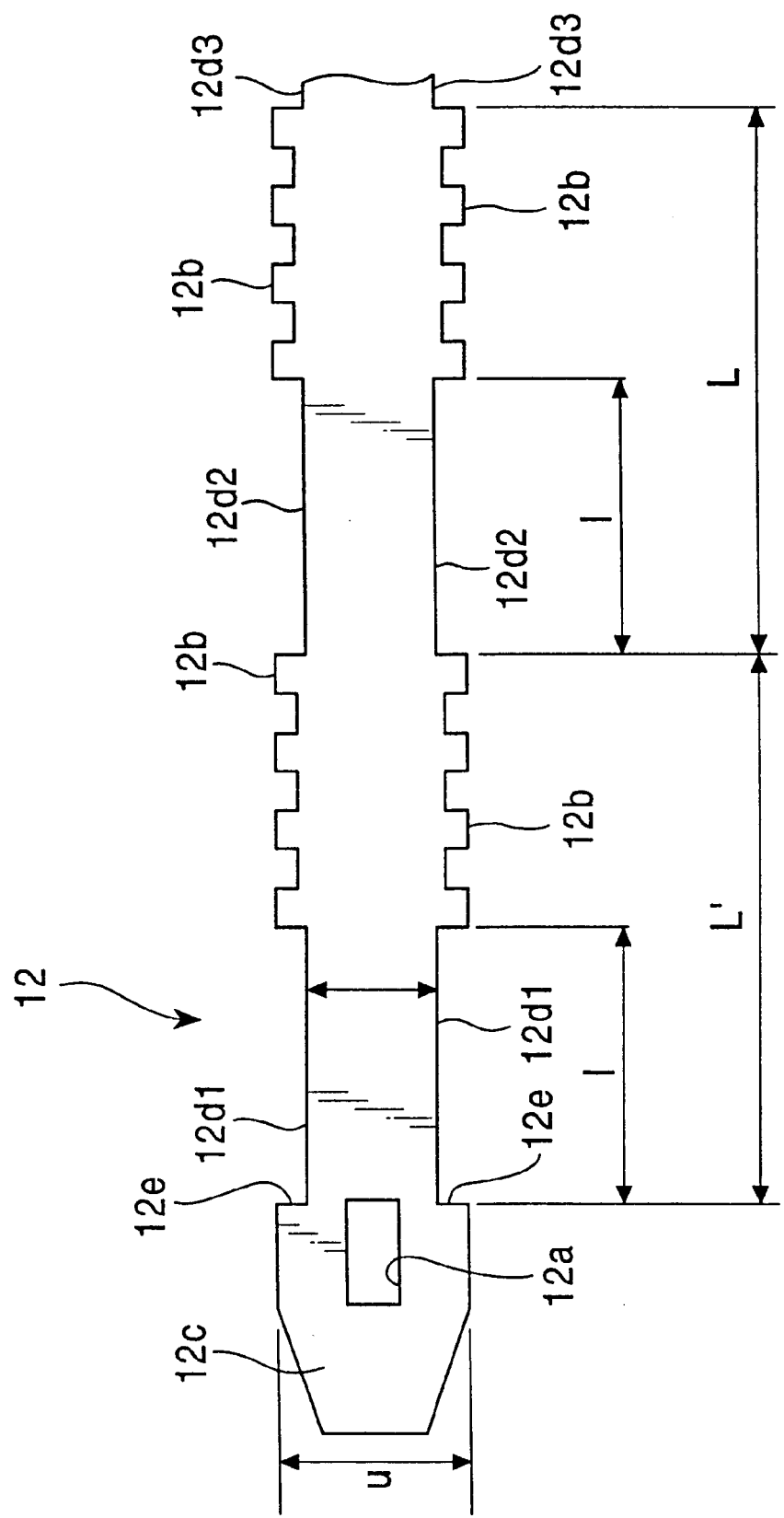
FIG. 7 is a front view showing a leader tape.

As shown in FIG. 7. tooth-like portions (protrusions) 12b are formed in the upper and lower side edges of the leader tape 12, and the forward end portion 12c of the leader tape 12 is formed as a tapered triangle. Further, in the tooth-like portions 12b, there are formed toothless portions 12d at fixed intervals. By forming the toothless portions 12d in the forward end portion, engagement edges 12e are formed at the upper and lower end portions of the rear end of the forward end portion 12c.

In the condition in which the leader tape 12 is wound around the tape winding portion 11, feeding teeth 7 and 8 formed on the flange portions 5 and 6 are engaged with the tooth-like portions 12b of the leader tape 12.

In the one-reel tape cassette 1, when it is not used, the tape reel 3 is biased downward by the compression coil spring 14 and the lower flange portion 6 is pressed against the inner bottom surface of the cartridge 2, and the lock teeth 16 formed in the outer peripheral edge of the lower surface of the lower flange 6 are engaged with the lock recesses 17 formed in the inner bottom surface of the cartridge 2, so that the tape reel 3 is prevented from being inadvertently rotated.

Next, with reference to FIGS. 8 through 16, the recording/reproducing apparatus 22 using the above-described one-reel tape cassette 1 will be described.

Figure 8:
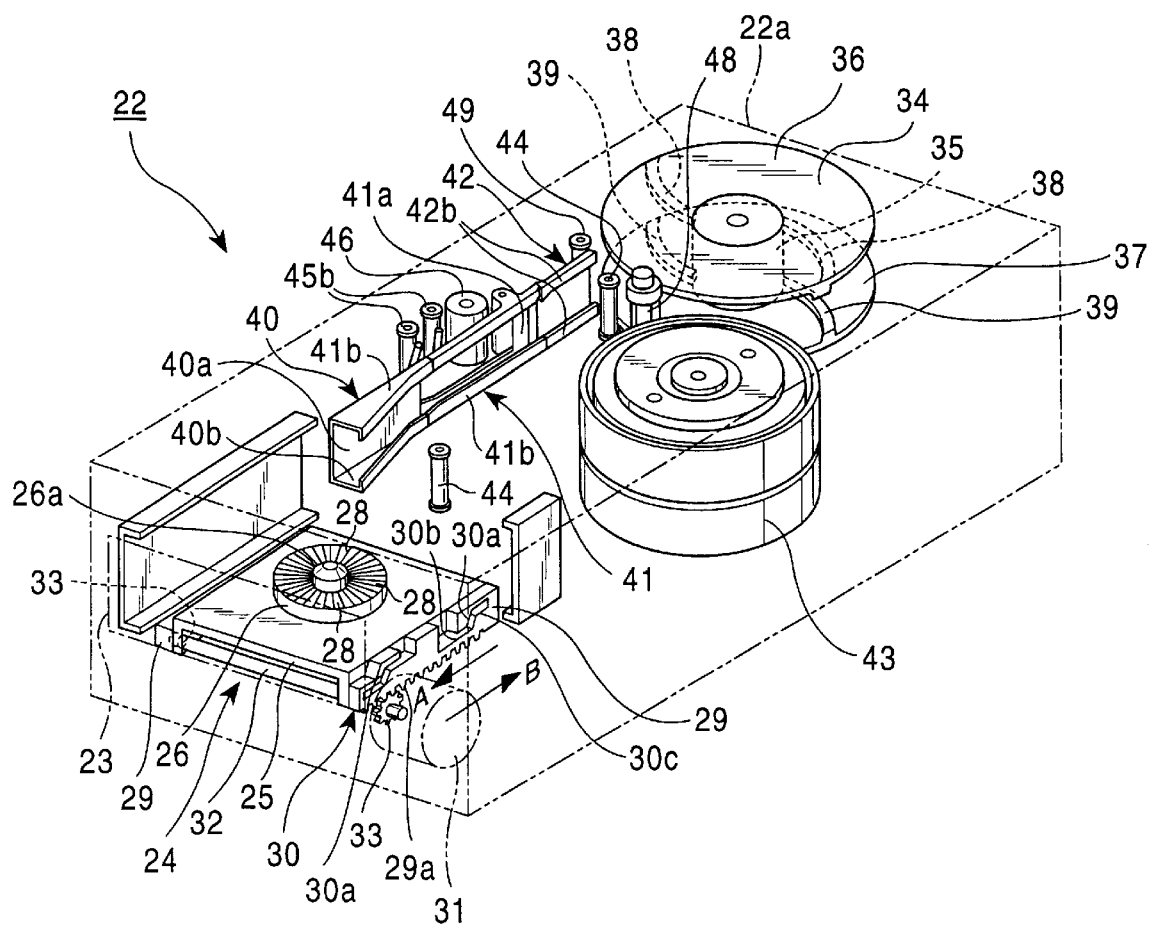
FIG. 8 is a schematic perspective view showing, with FIGS. 9 through 16, an embodiment of the recording/reproducing apparatus of the present invention.
Figure 9:
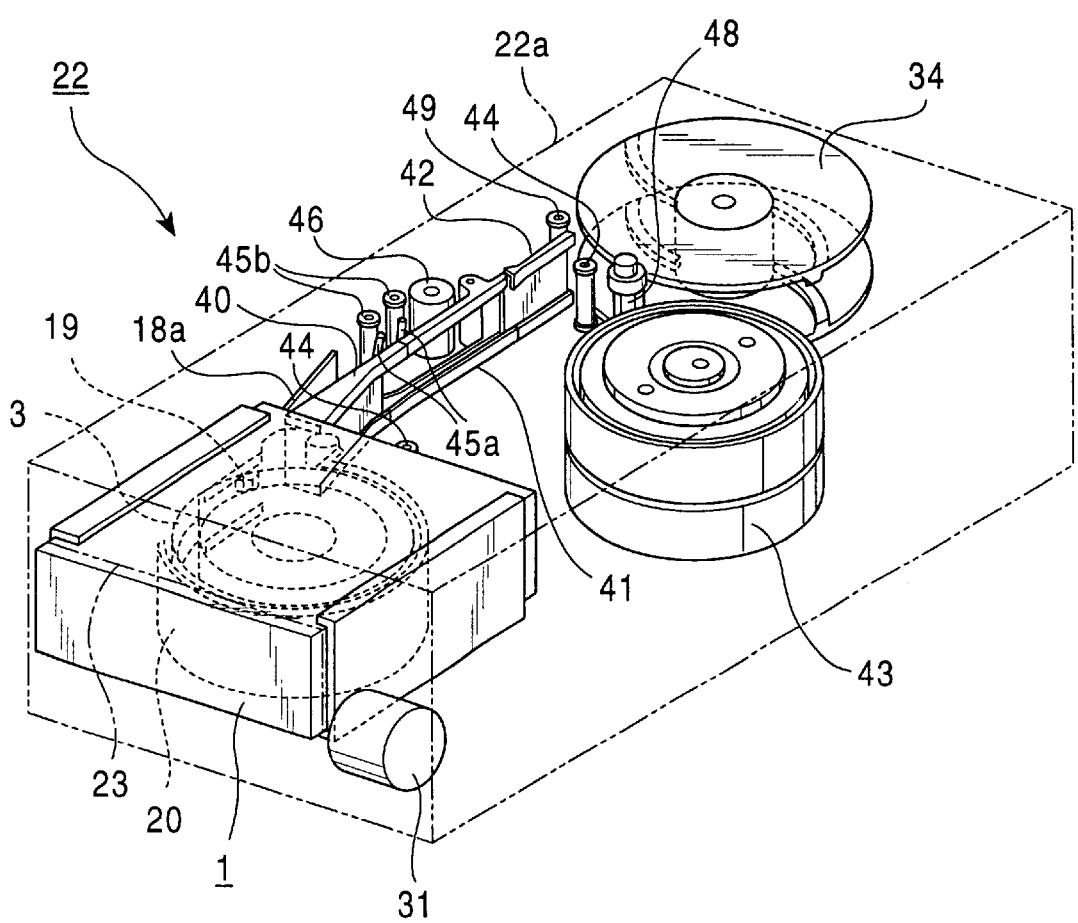
FIG. 9 is a schematic perspective view showing a one-reel tape cassette attached to a recording/reproducing apparatus.

As shown in FIG. 8, a cassette attachment/detachment hole 23 is formed in one side surface of the outer casing 22a of the recording/reproducing apparatus 22, and the one-reel tape cassette 1 is attached and detached through the cassette attachment/detachment hole 23.

A cassette attachment portion 24 is formed at a position adjacent to the cassette attachment/detachment hole 23 of a chassis (not shown) provided in the outer casing 22a. The cassette attachment portion 24 is provided with a reel stand base 25 which can ascend and descend. A reel stand 26 is supported by the reel stand base 25, and the reel stand 26 can be rotated in the normal and reverse directions by a reel stand motor 27. A reel engagement shaft 26a protrudes from the center of the upper surface of the reel stand 26, and engagement ridges 28 radially extending are formed around the reel engagement shaft 26a. The engagement ridges 28 are engaged with the engagement ridges 15 of the tape reel 3. Further, a clutch mechanism (not shown) is provided between the reel stand 26 and the motor 27, and when a load larger than a fixed level is applied, sliding occurs between the reel stand 26 and the reel stand motor 27.

As stated above, the reel stand base 25 can ascend and descend. Opposite to the two side surfaces on the opposed sides of the reel stand base 25, slide cams 29 are provided so as to be movable in the directions of the arrows A and B in FIG. 8. In each slide cam 29, two cam slits 30 are formed so as to be spaced apart from each other in the moving direction, and the cam slit 30 consists of an inclined portion 30a, a lower horizontal portion 30b connected to the lower end of the inclined portion 30a, and an upper horizontal portion 30c connected to the upper end of the inclined portion 30a. Further, on the lower surface of the slide cams 29, racks 29a are formed.

There are provided two pinions 33 which are rotated by an ascent/descent motor 31 and connected to each other by a synchronization shaft 32, and the pinions 33 are engaged with the racks 29a of the slide cams 29.

On the side surface of the reel stand base 25 opposed to the slide cams 29, there protrude two engagement pins (not shown) which are spaced apart from each other in the moving direction of the slide cams 29, and the engagement pins are slidably engaged with the cam slits 30 of the slide cams 29. The reel stand motor 27 is supported by this reel stand base 25.

When the ascent/descent motor is driven, the pinions 33 are rotated, and the racks 29a are fed by the pinions 33 and the slide cams 29 are moved. In the condition in which the slide cams 29 are positioned at the movement end in the direction of the arrow B, the engagement pins of the reel stand base 25 are engaged with the lower horizontal portions 30b of the cam slits 30, and the reel stand base 25 is positioned at the lowermost end of the movement range. When in this condition, the slide cams 29 move in the direction of the arrow A, the engagement pins of the reel stand base 25 reach the upper horizontal portions 30c by way of the inclined portions 30a of the cam slits 30, whereby the reel stand base 25 is positioned at the uppermost end of the movement range.

When the one-reel tape cassette 1 is inserted into the recording/reproducing apparatus 22 through the cassette attachment/detachment hole 23, the ascent/descent motor 31 is driven and the reel stand base 25 ascends, and the reel stand 26 is inserted into the cartridge 2 through the reel stand insertion hole 2a, and the upper surface of the reel stand 26 comes into contact with the lower surface of the hub 4 to pressurize this upward, so that the tape reel 3 moves somewhat upward against the biasing force of the compression coil spring 14. As a result, the engagement of the lock teeth 16 of the tape reel with the lock recesses 17 of the cartridge 2 is canceled, and the lock of the tape reel 3 is canceled (See FIG. 11). Further, at the same time, the tape reel 3 is brought into press contact with the reel stand 26 by the compression coil spring 14, and the reel engagement shaft 26a of the reel stand 26 is engaged with the center hole 4b in the lower surface of the hub 4, and centering of the tape reel 3 is effected. Further, the engagement ridges 15 on the lower surface of the hub 4 are engaged with the engagement ridges 28 on the upper surface of the reel stand 26, whereby the reel stand 26 and the tape reel 3 are joined together such that they rotate integrally.

The means for joining the tape reel 3 with the reel stand 26 so that they can rotate integrally is not restricted to the above-described engagement of the engagement ridges 15 with the engagement ridges 28. It is also possible to replace either the engagement ridges 15 or the engagement ridges 28 by a surface having a high coefficient of friction or form the abutting surfaces of the tape reel 3 and the reel stand 26 by surfaces having a high coefficient of friction and bring these two surfaces into press contact with each other to thereby connect the tape reel 3 and the reel stand 26 such that they rotate integrally.

On the side opposite to the cassette attachment portion 24, there is arranged a take-up reel 34 such that it can be rotated by a motor (not shown). The take-up reel 34 is equipped with a cylindrical hub 35 and flange portions 36 and 37 protruding from the upper and lower ends of the hub 35. On the lower surface of the flange portion 36, hooks 38 are formed at positions spaced apart from each other by 180 degrees. The hooks 38 are formed as ridges such that they exhibit a recessed circular arc from the inner peripheral edge to the outer peripheral edge of the flange portion 36, that is, in the direction of the arrow C in FIG. 10. Further, also at positions on the upper surface of the lower flange 37 opposed to the hooks 38, similar hooks 39 are formed. The distance between the lower surface of the hooks 38 and the upper surface of the hooks 39 is substantially the same as the vertical width T of the tape winding portion 9 of the tape reel 3, and the distance between the flange portions 36 and 37 is substantially the same as the vertical width U of the leader tape winding portion 11 of the tape reel 3.

The length 1 of the toothless portion 12d of the leader tape 12 is a length necessary for getting away from the hooks 38 and 39 of the take-up reel 34 at the time of taking up. It must be not smaller than the length from the forward ends 38a and 39a of the hooks 38 and 39 to the base ends 38b and 39b thereof, and the length L' from the engagement edge 12e to the forward end of the second toothless portion 12d2 is a length necessary for the engagement edges 12e to engage with the hooks 38 and 39 and for the next hooks 38 and 39 not to hit against the tooth-like portions 12b, and the following relationship is needed: 1<L'<1/2πD (where D is the diameter of the hub 35). Further, the formation pitch L of the toothless portions 12d from the second toothless portion 12d2 onward is the same as or slightly smaller than 1/2πD so that the tooth-like portions 12b may not hit against the hooks 38 and 39. That is, L is not equal to 1/2πD (however, L>1/2πD is not included).

The above-described take-up reel 34 and the tape reel 3 of the one-reel tape cassette 1 attached to the recording/reproducing apparatus 22 are positioned so as to be of the same height.

Three leader tape guides 40, 41 and 42 are arranged between the tape outlet 18 of the one-reel tape cassette 1 and the take-up reel 34. The tape guides 40 and 42 on both sides are stationary guides, and the intermediate tape guide 41 arranged between these two tape guides 40 and 42 is provided so as to be rotatable.

The leader tape guide 40 positioned close to the tape outlet 18 of the one-reel tape cassette 1 is equipped with a main surface portion 40a whose planar direction is vertical and recessed guide portions 40b formed such that the openings are opposed to each other at the upper and lower side edges of a surface opposed to a head drum described below. The recessed guide portions 40b are formed such that their width increases as they approach the tape outlet 18 of the one-reel tape cassette 1, and the forward end portion 12c of the leader tape 12 fed out from the tape outlet 18 is easily inserted into the recessed guide portions 40b.

The vertical width U of the main surface portion 40a is slightly larger than the vertical width u of the leader tape 12, and the distance T between the opening end of the upper recessed guide portion 40b and the opening end of the lower recessed guide portion 40b is slightly larger than the width t of the tape 10.

The leader tape guide 42 positioned close to the take-up reel 34 is equipped with a main surface portion whose planar direction extends vertically and recessed guide portions 42b formed such that their openings are opposed to each other at the upper and lower side edges of a surface of the main surface portion 42a opposed to a head drum described below. The end portion on the intermediate tape guide 41 side between the recessed guide portions 42b is formed such that its width gradually increases toward the end, whereby the forward end portion 12c of the leader tape 12 fed out from the intermediate tape guide 41 can be easily inserted into the recessed guide portions 42b.

The vertical width U of the main surface portion 42a is slightly larger than the vertical width u of the leader tape 12, and the distance T between the opening end of the upper recessed guide portion 42b and the opening end of the lower recessed guide portion 42b is slightly larger than the width t of the tape 10.

The intermediate tape guide 41 is equipped with a main surface portion 41a whose planar direction extends vertically and recessed guide portions 41b formed such that their openings are opposed to each other at the upper and lower side edges of a surface of the main surface portion 41a opposed to the head drum described below. The end portions of the recessed guide portions 41b on the tape guide 40 side positioned on the one-reel tape cassette 1 side are formed such that their width gradually increases toward the end, whereby the forward end portion 12c of the leader tape 12 fed out from the tape guide 40 on the one-reel tape cassette 1 side can be easily inserted into the recessed guide portions 41b.

The vertical width U of the main surface portion 41a is slightly larger than the vertical width u of the leader tape 12, and the distance T between the opening end of the upper recessed guide portion 41b and the opening end of the lower recessed guide portion 41b is slightly larger than the width t of the tape 10.

The intermediate tape guide 41 is rotatably supported on a chassis (not shown) at a position somewhat closer to the take-up reel 34 than the center with respect to the length direction. Of the main surface portion 41a, the portion on the cassette attachment portion 24 side with respect to the rotation fulcrum portion 41c is cut out to form a cutout portion 41d. The vertical width T of the cutout portion 41d is slightly larger than the width t of the tape 10.

Between the cassette attachment portion 24 of the chassis (not shown) and the take-up reel 34, and at a position opposed to the surface on which the recessed guide portions 40b, 41b and 42b of the leader tape guides 40, 41 and 42 are formed (hereinafter, this surface will be referred to as the "front surface" and the opposite surface will be referred to as the "back surface", there is arranged the head drum 43, and a rotary head (not shown) is provided in the head drum.

Stationary tape guides 44 are arranged close to the front surface side of the leader tape guides 40 and 42.

Further, on the back side of the portion of the intermediate tape guide 41 where the cutout portion 41d is formed, there are arranged lead-out guides 45 and a pinch roller 46. The lead-out guides 45 are provided with inclination guides 45a and rotation guides 45b.

Figure 10:
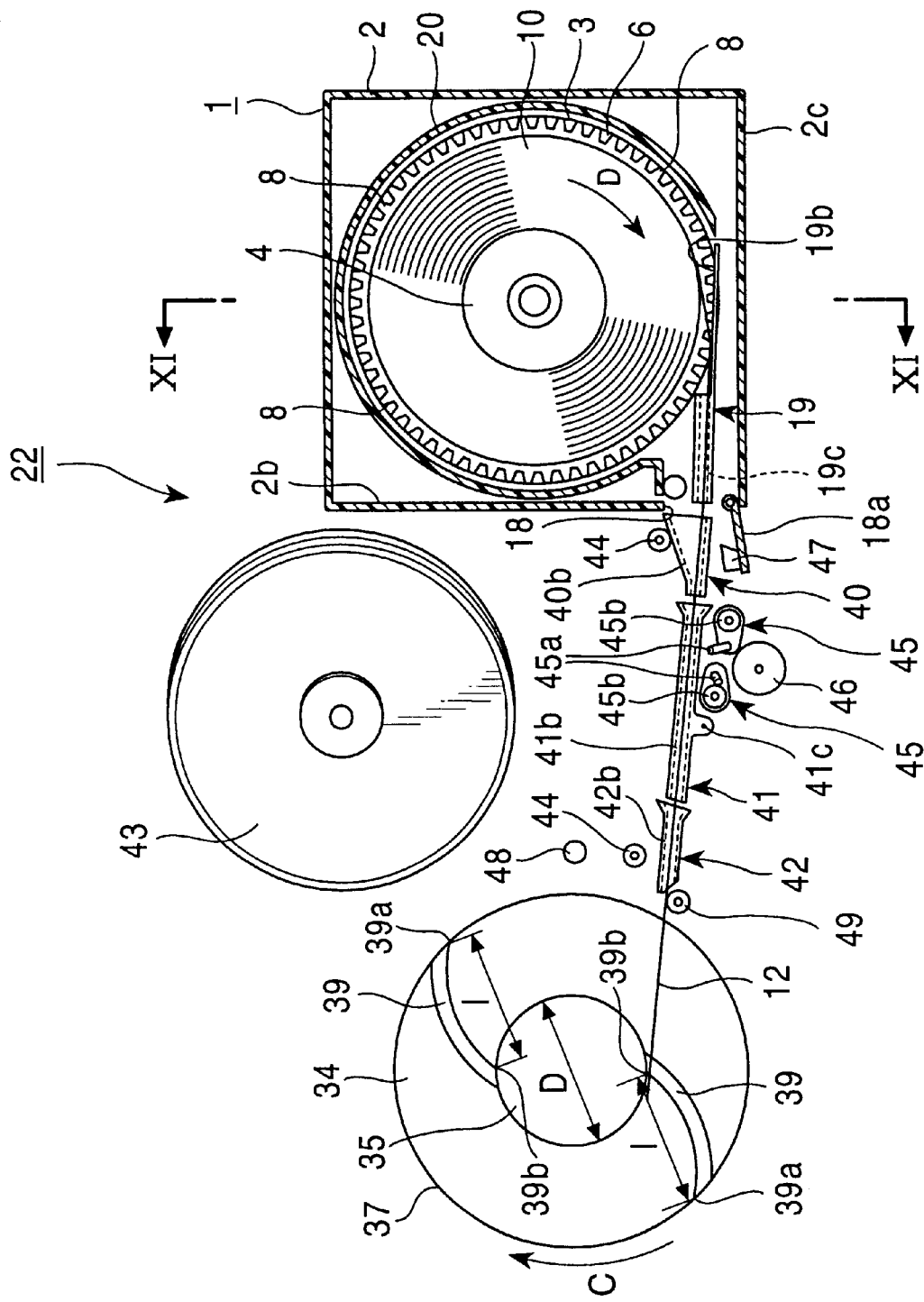
FIG. 10 is a schematic plan view showing the forward end portion of the leader tape engaged with the take-up reel.
Figure 11:
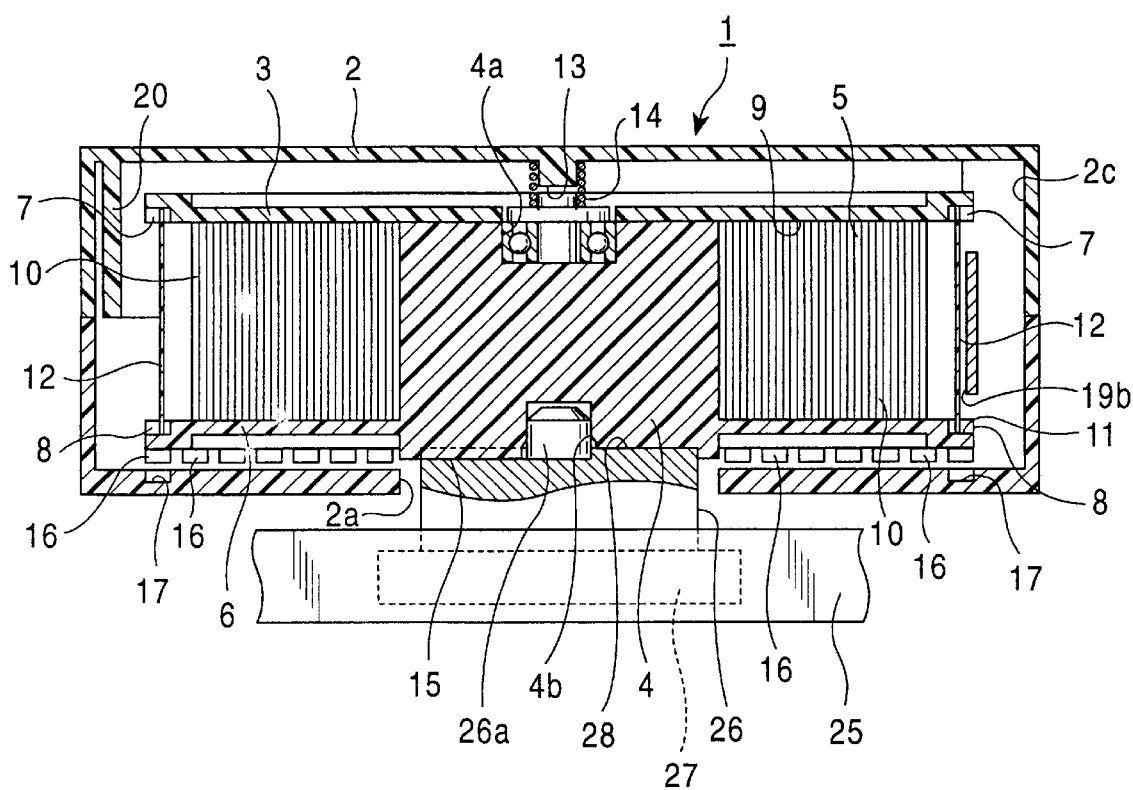
FIG. 11 is a sectional view taken along the line XI—XI of FIG. 10.

Further, as shown in FIG. 10, a lid opening/closing member 47 is arranged in the vicinity of the cassette attachment portion 24.

Furthermore, a capstan 48 is arranged at a position between the stationary tape guide 44 in the vicinity of the take-up reel 34 and the head drum 43.

Further, a stationary tape guide 49 for the leader tape 12 is arranged close to the take-up reel 34 side end on the back side of the leader tape guide 42.

Recording or reproduction using the above-described one-reel cassette 1 is conducted as follows.

In the condition in which the one-reel tape cassette 1 is not attached, the slide cams 29 are positioned at the movement end in the direction of the arrow B in FIG. 8, so that the reel stand base 25 is at the lowermost end of the movement range in which an engagement pin (not shown) is engaged with the lower horizontal portions 30b of the cam slits 30 of the slide cams 29. Thus, when the one-reel tape cassette 1 is inserted into the recording/reproducing apparatus 22 through the cassette attachment/detachment hole 23 and attached to the cassette attachment position 24, the ascent/descent motor 31 is driven and the slide cams 29 are moved in the direction of the arrow A, and the reel stand base 25 ascends. When the slide cams 29 reach the movement end in the direction of the arrow A, the reel stand base 25 is brought to a condition in which an engagement pin (not shown) is engaged with the upper horizontal portions 30c of the cam slits 30, and reaches the uppermost end of the movement range.

When the reel stand base 25 reaches the uppermost end of the movement range, the reel stand 26 is inserted into the cartridge 2 through the reel stand insertion hole 2a, and the tape reel 3 is somewhat raised with respect to the cartridge 2 to cancel the lock as described above, and the engagement ridges 28 of the reel stand 26 are engaged with the engagement ridges 15 of the tape reel 3. Further, in this position, the lid 18a is rotated to the open position by the lid opening/closing member 47 to open the tape outlet 18.

Next, the reel stand motor 27 is driven and the tape reel 3 is turned in the tape feed-out direction, that is, in the direction of the arrow D in FIG. 10, through the reel stand 26.

When the tape reel 3 is turned in the direction of the arrow D, the feeding teeth 7 and 8 feed the tooth-like portions 12b, so that the leader tape 12 receives force so that it is fed out from the cartridge 2, whereby the leader tape 12 is fed out through the tape outlet 18 of the cartridge 2.

The means for feeding out the leader tape 12 from the cartridge 2 is not restricted to the means formed by the tooth-like portions 12b and the feeding teeth 7 and 8. The means may also be formed, for example, by a large number of holes provided in the leader tape in the length direction thereof and protrusions provided on the tape reel and adapted to engage with the above-mentioned holes.

Figure 12:
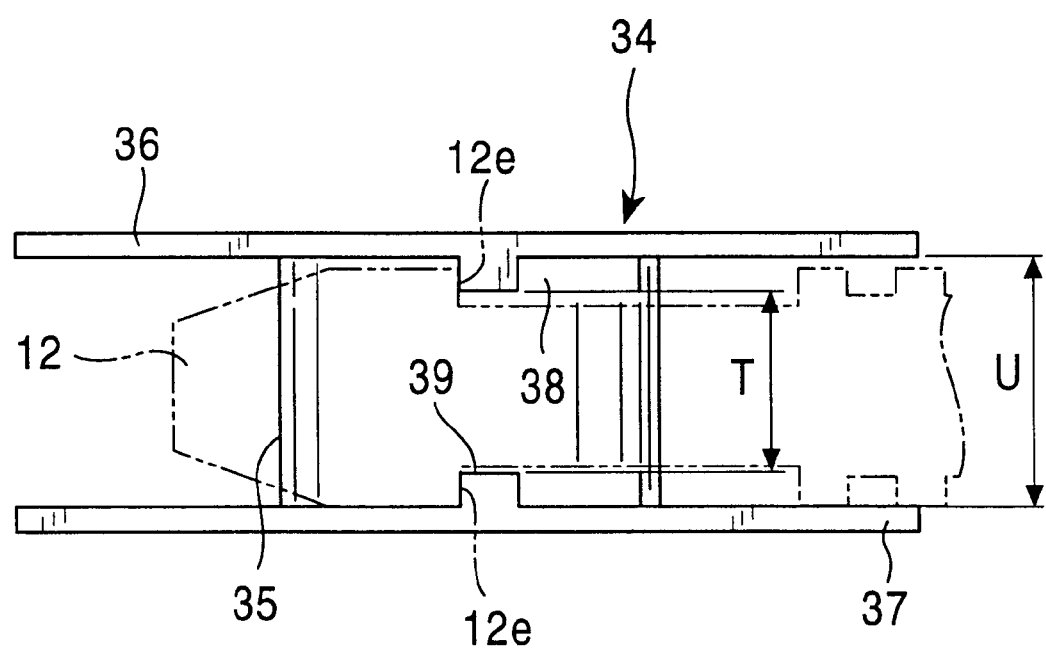
FIG. 12 is a side view of the take-up reel.

When the leader tape 12 is fed out from the cartridge 2, the leader tape 12 is sequentially guided by the leader tape guides 40, 41 and 42 and moved toward the take-up reel 34. When the forward end portion 12 of the leader tape 12 reaches a position between the flanges 36 and 37 of the take-up reel 34, this is detected by a means which is not shown (for example, a means formed by a reflection sensor and a hole provided in the leader tape), and the feeding of the leader tape 12 is stopped, and the take-up reel 34 starts to rotate in the direction of the arrow C in FIG. 10. As shown in FIG. 12, the engagement edges 12e of the leader tape 12 are hooked by the forward ends 38a and 39a of a pair of hooks 38 and 39 of the take-up reel 34, and by the rotation of the take-up reel 34 in the direction of the arrow C, the forward end portion 12c of the leader tape 122 is engaged with the base portions 38b and 39b of the hooks 38 and 39, whereby the leader tape 12 receives take-up force due to the rotation of the take-up reel 34, and is taken up by the hub 35. At this time, the above-mentioned L and L' are set to be values as mentioned above, so that there is no interference between the tooth-like portions 12b and the hooks 38 and 39 of the take-up reel 34.

Figure 16:
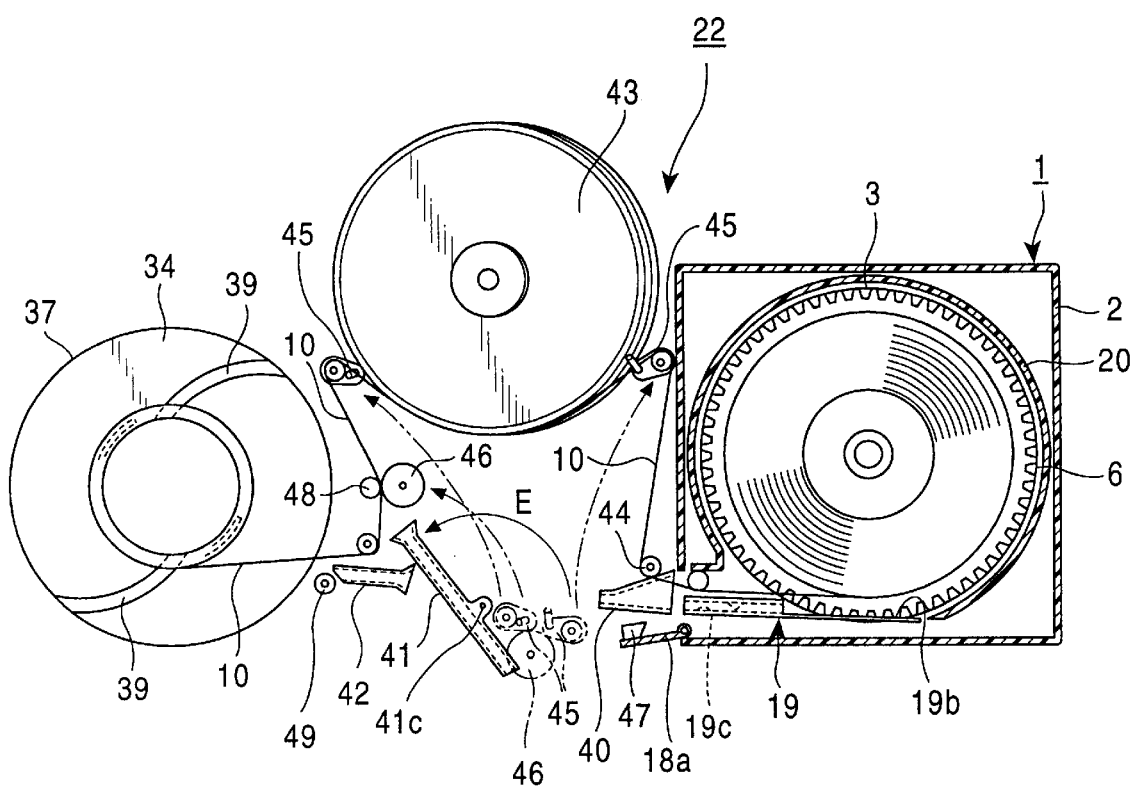
FIG. 16 is a schematic plan view showing the condition in which a tape path is formed.

When the tape 10 is taken up by the take-up reel 34 and drawn near to the take-up reel 34, the intermediate tape guide 41 rotates counterclockwise, that is, in the direction of the arrow E, the portion where the cutout portion 41d is formed escapes from the position between the lead-out guides 45 and the pinch roller 46 and the head drum 43 (See FIG. 16). When the intermediate tape guide 41 performs the above rotation, there is no interference between the intermediate tape guide 41 and the tape 10 since the cutout portion 41d is formed.

When the intermediate tape guide 41 rotates as described above, the lead-out guides 45 and the pinch roller 46 move in the direction indicated by the dotted-line arrow in FIG. 16, and the tape 10 is drawn out by the lead-out guides 45 and wound around the head drum 43. Further, the pinch roller 46 is brought into press contact with the capstan 48 through the intermediation of the tape 10.

The tape 10 is caused to run at fixed speed by the pinch roller 46 and the capstan 48, and taken up by the take-up reel 34, and, the rotary head (not shown) provided on the head drum 43 performs helical scanning on the tape 10 to thereby write (record) or read (reproduce) data to or from the tape 10.

The means for effecting the fixed speed running of the tape 10 is not restricted to the means formed by the pinch roller and the capstan. For example, it is also possible to cause the tape 10 to run at a fixed speed and in a stable manner through tape tension control of the drive motor (not shown) of the take-up reel 34.

Figure 13:
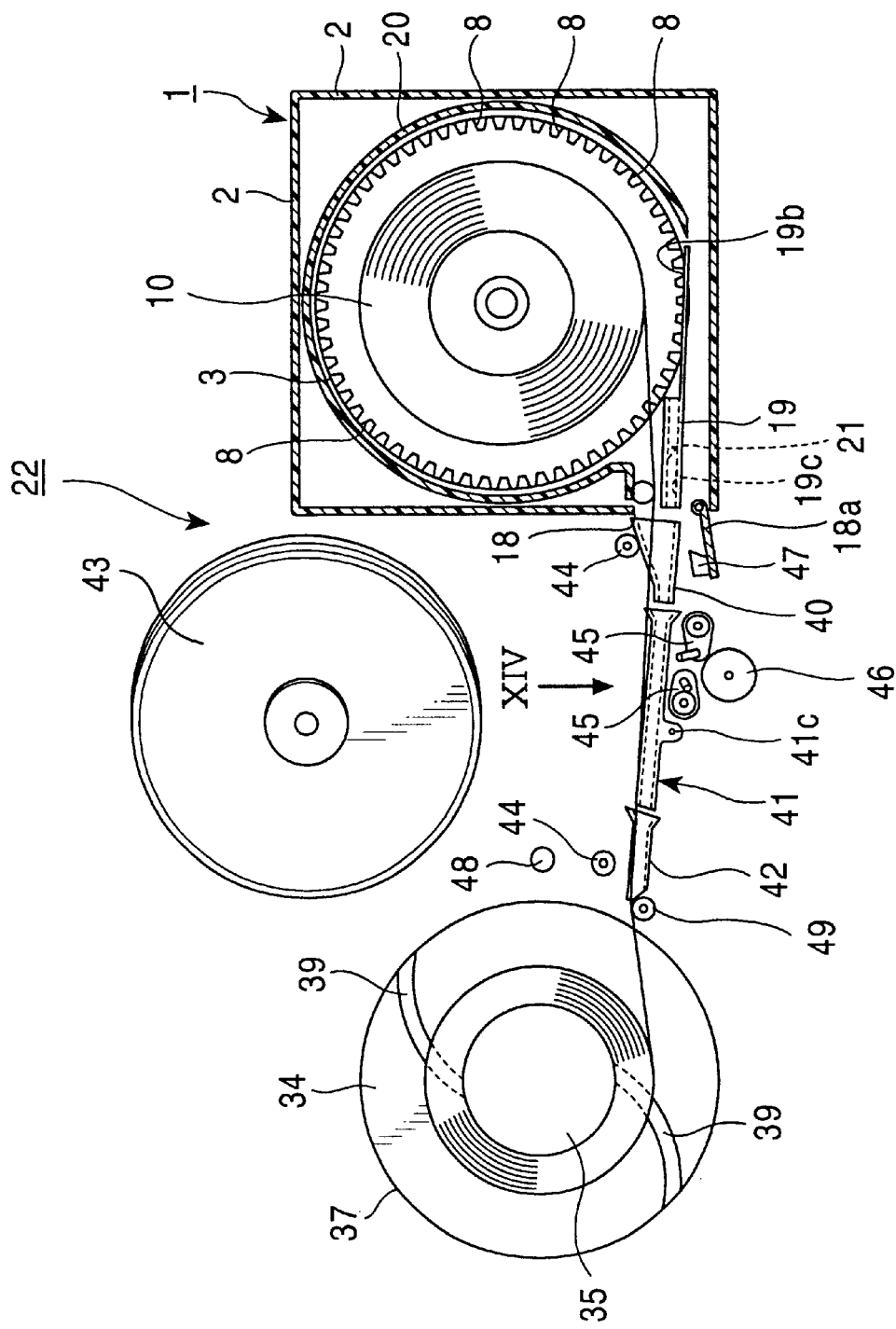
FIG. 13 is a schematic plan view showing the leader tape taken up by the take-up reel.
Figure 14:
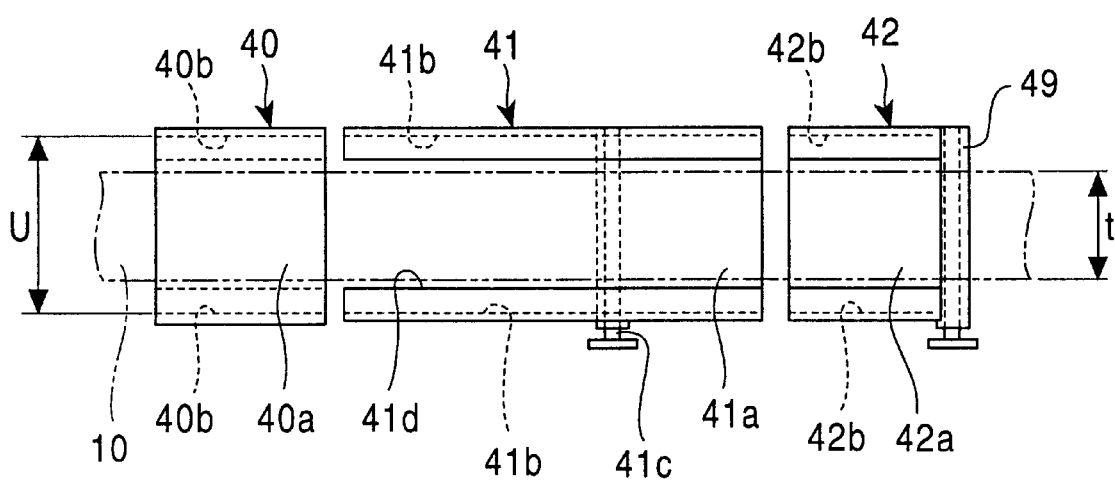
FIG. 14 is a view as seen from the direction of the arrow XIV of FIG. 13.
Figure 15:
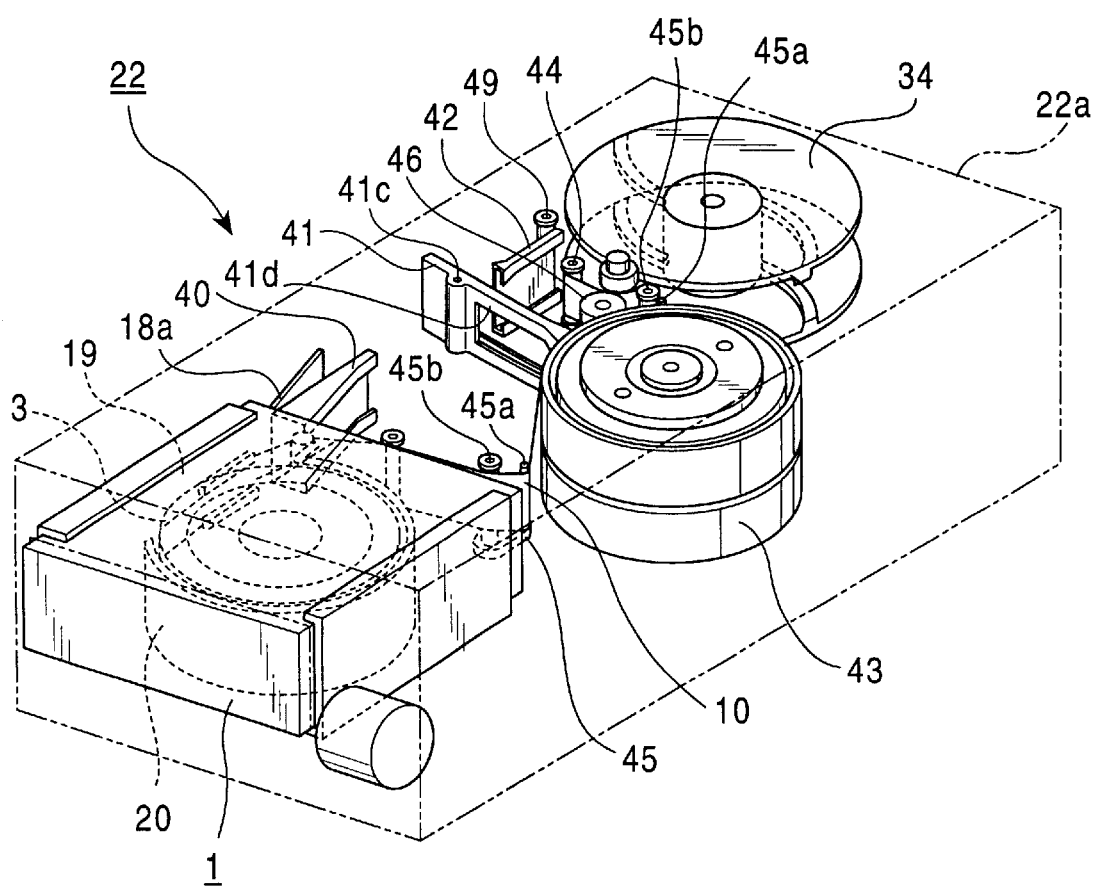
FIG. 15 is a schematic perspective view showing the condition in which a tape path is formed.

The high-speed running of the tape 10, that is, FF (fast forward) and REW (rewinding), is effected in the condition shown in FIG. 13, that is, in the condition in which the tape 10 is not in contact with the head drum 43, the stationary tape guides 44, the lead-out guides 45, the pinch roller 46, and the capstan 48, and in such a manner as to form a substantially linear path from the tape reel 3 to the take-up reel 34, whereby it is possible to minimize damage to the tape 10.

When the writing (recording) or reading (reproduction) of data to or from the tape 10 is completed, the lead-out guides 45 and the pinch roller 46 are returned to the original positions (See FIG. 13), and then the intermediate tape guide 41 rotates counterclockwise, that is, in the direction opposite to the direction of the arrow E, to be aligned with the other leader tape guides 40 and 42.

Next, the tape reel 3 rotates in the tape take-up direction, that is, in the direction opposite to the direction of the arrow D shown in FIG. 10, to take up the tape 10, whereby the tape 10 is taken up by the tape take-up portion 9 of the tape reel 3.

When the tape 10 has been entirely taken up by the tape take-up portion 9, the leader tape 12 is taken up by the tape take-up portion 11, with the tooth-like portions 12b being engaged with the feeding teeth 7 and 8.

The speed at which the taking up is effected by the tape reel 3 is reduced when the forward end portion 12c of the leader tape 12 is released from the engagement with the take-up reel 34, and torque control is effected just before the forward end portion 12c enters the cartridge 2 to thereby reduce the take-up torque.

Finally, the engagement hole 12a of the leader tape 12 is engaged with the engagement surface 21a of the stopper 21 of the tape guide portion 19, and the taking up of the tapes 10 and 12 is completed. By the above control of the take-up torque by the tape reel 3, the engagement of the stopper 21 with the engagement hole 12a is reliably effected.

It may happen by accident that the engagement hole 12a is not engaged with the stopper 21. In such a case, the leader tape 12 is drawn into the cartridge 2 beyond a predetermined position. Even in this case, when the tape reel 3 rotates in the direction of the arrow D, the tooth-like portions 12b of the leader tape 12 are fed by the feeding teeth 7 and 8 of the tape reel 3, whereby the leader tape 12 is pressed against the leader tape guide wall 20. Due to its elasticity, it receives a force in the feed-out direction to move in the feed-out direction, and the upper and lower side edge portions thereof are engaged with the recessed guide portions 19c while the forward end portion 12c thereof is held in press contact with the tape press contact surface 19b. In this way, the leader tape 12 is reliably fed out from the cartridge 2.

When an eject button (not shown) is depressed, the lid 18a is closed to close the tape outlet 18, and then the one-reel tape cassette 1 is discharged through the cassette attachment/detachment hole 23.

In the above-described one-reel cassette 1, the leader tape 12 can be fed out solely by the rotation drive force of the tape reel 3, so that, compared with the conventional system in which the leader tape 12 is fed to draw out the leader tape 12 from the take-up side, the construction is substantially simplified.

Even when the engagement of the engagement hole 12a of the leader tape 12 with the stopper 21 of the tape guide portion 19 is canceled, rotating the tape reel 3 in the feed-out direction causes the forward end portion 12c of the leader tape 12 to move along the leader tape guide wall 20 provided so as to substantially surround the entire periphery of the tape reel 3, and its upper and lower side edge portions reliably enter the recessed guide portions 19c of the tape guide portion 19.

Further, in the above-described recording/reproducing apparatus 22, the height of the tape reel 3 of the one-reel tape cassette 1 attached to the recording/reproducing apparatus 22 is the same as the height of the take-up reel 34 provided in the recording/reproducing apparatus 22, and after winding the leader tape 12 around the take-up reel 34, the lead-out guides 45 and the pinch roller 46 are moved to form the tape path, so that it is possible to make the feed-out path for the leader tape 12 from the tape reel 3 to the take-up reel 34 substantially linear, making it possible to simplify the mechanism for feeding out the leader tape 12. Furthermore, since the feed-out path is linear, the feeding load of the leader tape 12 is small, and it is little subject to changes in the rigidity of the leader tape 12 even at low temperatures.

Further, since the configuration of the forward end portion 12c of the leader tape 12 is such that it can be automatically taken up by the take-up reel 34 through the rotation of the take-up reel 34, tape loading can be conducted easily and reliably.

Furthermore, the intermediate tape guide 41 is rotatable, and there is provided a cutout portion 41d for escaping the tape 10, and after taking up the leader tape 12 onto the take-up reel 34, the intermediate tape guide 41 is rotated, and the lead-out guides 45 and the pinch roller 46 arranged on the back side thereof are moved to form the path for the tape 10, so that the leader tape 12 is not brought into contact with important parts such as the head drum 43, the rotary head, the stationary tape guides 44, the lead-out guides 45, the pinch roller 46, and the capstan 48, and the leader tape 12 does not adversely affect these important parts which are arranged along the running path for the tape 10.

While in the above-described recording/reproducing apparatus 22 a rotary head is adopted, it is also possible to adopt a stationary head.

Further, the configuration and construction of the portions of the above-described embodiment are only given by way of example, and the technical scope of the present invention is not to be construed restrictively on the basis of this example.

As is apparent from the above description, in accordance with the present invention, there is provided a recording/reproducing apparatus of the type which uses a tape cassette which has a tape reel in a cartridge and in which a tape including a tape-shaped recording medium is wound around the tape reel, the apparatus comprising a take-up reel adapted to take up the tape-shaped recording medium and having a height equal to that of the tape reel of the tape cassette attached to the recording/reproducing apparatus, and a rotary head for recording and/or reproducing information on and/or from the tape-shaped recording medium by a helical scan system.

Thus, in the recording/reproducing apparatus of the present invention, recording and/or reproduction is conducted by helical scanning, so that it is possible to achieve an increase in recording density. Further, by making the height of the take-up reel the same as the height of the tape reel of the tape cassette attached to the recording/reproducing apparatus, it is possible to simplify the tape loading mechanism.

According to the invention as claimed for another feature of the invention, there is provided a tape running system member for forming a tape path by moving from a standby position to an operating position after a tape is wound around the take-up reel, so that it is possible to make the supply path for the first tape substantially linear, whereby it is possible to simplify the mechanism for tape loading and tape running.

According to another feature of the invention, in the tape cassette, a leader tape whose width is at least partly larger than the width of the tape-shaped recording medium is joined to the forward end of the tape-shaped recording medium and wound around the tape reel, and there is provided a leader tape guide which guides the leader tape substantially linearly from the tape cassette to the take-up reel, so that it is possible to cause the leader tape to reach the take-up reel solely by the pressing force due to the rotation of the tape reel of the tape cassette, making it possible to simplify the mechanism for taking up the tape.

What is claimed is:

1. A recording/reproducing apparatus of the type which uses a tape cassette which has a tape reel in a cartridge and in which a tape including a tape-shaped recording medium and a leader tape joined to the forward end of the tape-shaped recording medium are wound around the tape reel, the apparatus comprising:

a leader tape guide for guiding during a stationary state the leader tape through a substantially linear path between a take-up reel for taking up the tape and a tape outlet of the tape cassette attached to a cassette attachment portion while the leader tape is being fed from the cartridge to the take-up reel by rotating the tape reel, wherein a head is arranged on one side of the leader tape guide, and a lead-out guide in a standby state is arranged on the other side thereof, and wherein the leader tape guide is rotated and retracted from between the head and the lead-out guide when the tape-shaped recording medium has reached a position corresponding to the leader tape guide, and a tape path is formed in which the lead-out guide is moved to a loading position to cause the tape-shaped recording medium to be opposed to the head.

2. A recording/reproducing apparatus according to claim 1, wherein the leader tape guide is rotatably provided, and wherein the leader tape guide is provided with a cutout portion having a width larger than the width of the tape-shaped recording medium.

3. A recording/reproducing apparatus according to claim 2 further comprising:

engagement means adapted to engage with an engagement portion formed at the forward end of the leader tape and provided on opposed surfaces of upper and lower flange portions of the take-up reel.

4. A recording/reproducing apparatus according to claim 3, wherein the engagement portion consists of engagement edges formed on the upper and lower edges of the leader tape and extending in the tape width direction, and wherein the engagement means are hooks which extend from the outer peripheral edges to the base portions of the flange portions and which are in the form of ridges recessed in the take-up direction.

5. A recording/reproducing apparatus as set forth in claim 1, further comprising:

the take-up reel adapted to take up the tape-shaped recording medium and having a height equal to that of the tape reel of the tape cassette attached to the recording/reproducing apparatus, and a rotary head for recording and/or reproducing information on and/or from the tape-shaped recording medium by a helical scan system.

6. A recording/reproducing apparatus according to claim 5, further comprising a tape running system member for forming a tape path by moving from a standby position to an operating position after the tape is wound around the take-up reel.

7. A recording/reproducing apparatus according to claim 6, wherein, in the tape cassette, the tape whose width is at least partly larger than the width of the tape-shaped recording medium is joined to the forward end of the tape-shaped recording medium and wound around the tape reel, and wherein there is provided the leader tape guide which guides the leader tape substantially linearly from the tape cassette to the take-up reel.

8. A recording/reproducing apparatus according to claim 5, wherein, in the tape cassette, the leader tape whose width is at least partly larger than the width of the tape-shaped recording medium is joined to the forward end of the tape-shaped recording medium and wound around the tape reel, and wherein there is provided the leader tape guide which guides the leader tape substantially linearly from the tape cassette to the take-up reel.

9. A recording/reproducing apparatus as set forth in claim 1, wherein said tape cassette, which has the tape reel in a cartridge and in which the tape-shaped recording medium and the leader tape joined to the forward end of the tape-shaped recording medium are wound around the tape reel, comprises:

engagement edges formed on the upper and lower edges of the forward end portion of the leader tape and extending in the tape width direction.

10. A recording/reproducing apparatus according to claim 9, wherein the leader tape is fed out from the cartridge by rotation of the tape reel in one direction.

* * * * *